(12) United States Patent
Razdow et al.

(10) Patent No.: US 8,121,998 B2
(45) Date of Patent: Feb. 21, 2012

(54) METHOD FOR AUTOMATICALLY ENABLING TRACEABILITY OF ENGINEERING CALCULATIONS

(75) Inventors: Allen Razdow, Belmont, MA (US); Christopher Baril, Malden, MA (US); Frederick R. Mueller, Cambridge, MA (US); Jeremy Lew, Watertown, MA (US); Jonathan Bell, Brookline, MA (US); Leopold Travis, Somerville, MA (US)

(73) Assignee: Parametric Technology Corporation, Needham, MA (US)

( * ) Notice: Subject to any disclaimer, the term of this patent is extended or adjusted under 35 U.S.C. 154(b) by 316 days.

(21) Appl. No.: 11/070,827

(22) Filed: Mar. 2, 2005

(65) Prior Publication Data

US 2006/0080369 A1    Apr. 13, 2006

Related U.S. Application Data

(60) Provisional application No. 60/550,125, filed on Mar. 4, 2004.

(51) Int. Cl.
*G06F 7/00* (2006.01)
(52) U.S. Cl. ..................................... 707/706
(58) Field of Classification Search .................. None
See application file for complete search history.

(56) References Cited

U.S. PATENT DOCUMENTS

| | | | | |
|---|---|---|---|---|
| 5,469,538 A * | 11/1995 | Razdow | ......................... | 345/440 |
| 5,526,475 A | 6/1996 | Razdow | ......................... | 395/746 |
| 5,761,079 A * | 6/1998 | Drumm | ........................... | 716/11 |
| 5,771,392 A | 6/1998 | Razdow | .................. | 395/800.06 |
| 5,844,555 A | 12/1998 | Menaker et al. | ............... | 345/338 |
| 5,926,822 A * | 7/1999 | Garman | ......................... | 715/503 |
| 6,151,610 A | 11/2000 | Senn et al. | ..................... | 707/516 |
| 6,195,662 B1 * | 2/2001 | Ellis et al. | ................. | 707/103 R |
| 6,275,866 B1 * | 8/2001 | Boulia et al. | ................... | 719/315 |
| 6,405,225 B1 * | 6/2002 | Apfel et al. | .................... | 715/210 |
| 6,519,603 B1 | 2/2003 | Bays et al. | ..................... | 707/102 |
| 6,549,922 B1 | 4/2003 | Srivastava et al. | ............. | 707/205 |
| 6,560,176 B1 | 5/2003 | Heylen | ......................... | 369/53.1 |
| 6,573,907 B1 | 6/2003 | Madrane | ....................... | 715/719 |

(Continued)

OTHER PUBLICATIONS

Singh et al. "A metadata catalog service for data intensive applications", Information Sciences Institute, University of Southern California, Nov. 2003.*

(Continued)

*Primary Examiner* — Charles Rones
*Assistant Examiner* — Dinku Gebresenbet
(74) *Attorney, Agent, or Firm* — Weingarten, Schurgin, Gagnebin & Lebovici LLP

(57) ABSTRACT

An improved method and system for managing the traceability of numerical, alphabetical, alphanumeric, character, or string entities such as critical constants or key calculations, equations, functions, and procedures that automatically enables the traceability of information entities without requiring significant manual intervention by a system user. The system allows a user to enter critical information such a critical constant or key calculation into a first document. When the user copies/exports the critical information from the first document and pastes/imports the information to a second document, the system automatically generates meta-data describing the provenance of the information, and propagates the provenance meta-data from the first document to the second document. By accessing provenance meta-data contained within respective documents, the user can track where critical information within a document originally came from, and which intermediary document or documents the critical information came from last.

55 Claims, 9 Drawing Sheets

U.S. PATENT DOCUMENTS

| | | | |
|---|---|---|---|
| 6,583,800 B1 | 6/2003 | Ridgley et al. | 715/854 |
| 6,622,147 B1 | 9/2003 | Smiga et al. | 707/102 |
| 6,633,888 B1 | 10/2003 | Kobayashi | 707/103 R |
| 6,681,391 B1 | 1/2004 | Marino et al. | 717/175 |
| 6,711,590 B1 | 3/2004 | Lennon | 707/200 |
| 6,760,746 B1 | 7/2004 | Schneider | 709/203 |
| 6,789,054 B1* | 9/2004 | Makhlouf | 703/6 |
| 7,469,274 B1* | 12/2008 | Ryu et al. | 709/214 |
| 2004/0098362 A1* | 5/2004 | Gargi | 707/1 |
| 2004/0128269 A1* | 7/2004 | Milligan et al. | 707/1 |
| 2004/0172584 A1* | 9/2004 | Jones et al. | 715/500 |
| 2005/0060315 A1* | 3/2005 | Sanin | 707/9 |

OTHER PUBLICATIONS

Provenance: Problem, Architectural issues, Towards Trust, Luc Moreau, University of Southampton, material provided at the Data Provenance and Annotation Workshop, e-Science Institute, 15 South College Street, Edinburgh, UK, Dec. 2003.

RequisitePro extensibility interface sample: Setting traceability using the RPX, Jun. 19, 2004.

Attribute to Traceability RequisitePro Script, IBM, Sep. 29, 2004.

RequisitePro cross-project traceability by keyword, Christopher J. Davis, IBM, Nov. 24, 2004.

* cited by examiner

METHOD FOR AUTOMATICALLY ENABLING TRACEABILITY OF ENGINEERING CALCULATIONS

CROSS REFERENCE TO RELATED APPLICATIONS

This application claims priority of U.S. Provisional Patent Application No. 60/550,125 filed Mar. 4, 2004 entitled A METHOD FOR AUTOMATICALLY ENABLING TRACEABILITY OF ENGINEERING CALCULATIONS.

STATEMENT REGARDING FEDERALLY SPONSORED RESEARCH OR DEVELOPMENT

N/A

BACKGROUND OF THE INVENTION

The present invention relates generally to methods and systems for automatically enabling the traceability of numerical, alphabetical, alphanumeric, character, or string entities such as critical constants or key calculations, equations, functions, and procedures, and more specifically to methods and systems for determining the provenance of such entities within a document, a worksheet, a spreadsheet, a table, a data file, a media file, or a software program.

Individuals engaged in scientific and engineering activities frequently employ critical values or constants derived from the principles of mechanics, electromagnetism, chemistry, and other disciplines to perform key calculations. Scientists and engineers in small to large organizations have traditionally performed such calculations using a variety of tools ranging from handheld calculators and spreadsheet programs to sophisticated calculation systems such as MATHCAD™, MATLAB™, and MATHEMATICA™ calculation systems. In such organizations, scientists, engineers, and/or management personnel are typically responsible for keeping track of the many software programs, worksheets, and data files required to drive these calculation tools, and for documenting and auditing the various assumptions, procedures, and results of the calculations performed using these tools. This situation has led to an ever increasing need for improved techniques and systems for managing audits of critical information in scientific and engineering organizations.

Specifically, the auditing of information used by scientists and engineers typically involves the concept of traceability, e.g., the ability to trace back from a particular critical value or calculation result to the initial assumptions and data underlying that value or result. The traceability of critical information enables scientists and engineers to determine whether a group of calculations employs the same approved value for a given parameter, and to determine which calculations depend either directly or indirectly on that value or parameter. The traceability of critical information also allows scientists and engineers to verify, validate, and authenticate the information, thereby providing such critical information with increased levels of integrity.

In recent years, the need to manage the traceability of critical information has been exacerbated as many scientific and engineering organizations have evolved into highly collaborative environments, in which large numbers of scientists and engineers interact as members of centralized or de-centralized project teams. Such environments are typically characterized by increased amounts of data, calculation, and resource sharing among the scientists and engineers, who may be widely dispersed in various geographic locations, and who may rely almost exclusively on public and/or private telecommunications networks to access information and resources and to communicate with management and colleagues. Having the ability to trace information in such highly collaborative environments is needed to assure that scientists and engineers trust the critical information provided to them by the various project teams, and to assure that the scientists and engineers understand how that information has been generated, modified, and used throughout the organization.

Conventional information management systems are generally capable of providing information relating to, e.g., the origin and history of data, how certain data analyses are performed, and what analysis results are obtained, by capturing annotations about this information. For example, a conventional information management system typically allows a user to generate annotations for selected subdivisions in a file or database, to convert the annotations to a structured form, and to store the annotations in that form along with connections to the corresponding subdivisions. The user can then access the various file/database subdivisions by providing the system with a query in a natural language or structured format, thereby causing the system to match the query against the stored annotations and to retrieve the file/database subdivisions connected to the matched annotations.

The conventional information management system described above has drawbacks, however, in that it is generally incapable of managing the traceability of information without requiring significant manual effort on the part of the user. Although the conventional information management system provides scientists and engineers with a way of capturing and storing annotations relating to, e.g., the origin and history of data, such annotations must normally be manually entered into the system and are therefore subject to omission, mistake, and falsification. Further, one or more documents containing such data may be incapable of being identified unambiguously, or may be misidentified, e.g., in the event multiple versions of the document exist. Because user-generated annotations often fail to provide any meaningful verification or validation of data, they are generally incapable of providing scientists and engineers with a high level of confidence in the integrity of their critical information.

It would therefore be desirable to have an improved method and system for managing the traceability of information such as critical constants or key calculations, equations, functions, and procedures in scientific and engineering organizations. Such a method and system would be capable of managing the traceability of critical information automatically, without requiring significant manual effort of a system user. It would also be desirable to have a method and system that automatically updates and propagates data relating to the traceability of critical information as that information is copied, modified, and/or re-used throughout a scientific or engineering organization.

BRIEF SUMMARY OF THE INVENTION

In accordance with the present invention, an improved method and system for managing the traceability of numerical, alphabetical, alphanumeric, character, or string entities such as critical constants or key calculations, equations, functions, and procedures is provided that automatically enables the traceability of information entities without requiring significant manual intervention by a system user. The presently disclosed method and system automatically generate meta-data describing the provenance of such critical information, embed the provenance meta-data within a document containing the critical information, and propagate the provenance meta-data along with the information as it is copied, cut, pasted, moved, modified, and/or re-used. As herein described, provenance meta-data includes information relating to the document or location that the critical information originally came from, and the intermediary document or location that the critical information came from last (if any).

In one embodiment, the improved information management system is operative to create a document comprising, e.g., a worksheet, a spreadsheet, a table, a data file, a media file, or a software program, for storing information such as critical values or constants and key calculations and results. In the preferred embodiment, the format of the document is based on the extended Markup Language (XML) document format. Further, the XML-based document can have a plurality of meta-data fields in the XML format embedded within or otherwise incorporated into the document. The system is operative to automatically generate meta-data describing the provenance of a predetermined region within the XML-based document, or a plurality of predetermined sub-regions of the document.

In one mode of operation, a system user enters critical information such as one or more critical constants or key calculations into an original XML-based source document, in which each critical constant or key calculation represents a respective sub-region of the document. Next, when the system user copies/cuts and pastes selected critical information from the original source document to a second document, the information management system automatically generates region-level meta-data describing the provenance of the selected critical information, propagates the provenance meta-data to the second document, and stores the provenance meta-data in at least one respective meta-data field embedded within the second document. While performing the copying/cutting and pasting operations, the system propagates the selected critical information and the provenance meta-data for that information from one document to another document via the system clipboard.

By accessing the provenance meta-data automatically generated by the system when selected critical information is copied-and-pasted or otherwise moved from one document to another, the system user can track where critical information within a document originally came from, and which intermediary document or documents the critical information came from last (if any). In the presently disclosed embodiment, the system includes one or more input devices such as a mouse and a keyboard, and at least one output device such as a video monitor or display. The user can access the provenance meta-data corresponding to selected information within, e.g., the above-described second document, by viewing a representation of the selected information on the video display, and by "clicking" on an active region of the display including the representation of the information using the mouse, to generate a popup display window containing indications of the provenance meta-data for that information. For example, the popup display window can contain the identity of the source document that the critical information originally came from, and the identity of the intermediary document that the information came from last. The information management system does not allow the user to modify the indications of the provenance meta-data contained in the popup display window.

In the presently disclosed embodiment, the information management system also allows the user to optionally enter annotation meta-data relating to the selected critical information into the original source document. The system then stores the user-generated annotation meta-data in at least one meta-data field embedded within the source document. In the disclosed embodiment, the user-generated annotation meta-data comprises text-based annotation meta-data. When the system user copies/cuts and pastes the selected critical information from the original source document to the second document, the system causes the annotation meta-data entered by the user to propagate from the source document to the second document along with the provenance meta-data for that information, for subsequent storage in at least one respective meta-data field embedded within the second document. The user can then access the user-generated annotation meta-data via the popup display window, as described above. For example, the popup display window may include a first tab corresponding to the user-generated annotation meta-data, and a second tab corresponding to the system-generated provenance meta-data corresponding to the selected critical information within the second document. Next, the user may access the annotation meta-data or the provenance meta-data by clicking on the appropriate tab, thereby causing the desired information to be displayed within the display window. In the preferred embodiment, the information management system does not allow the user to modify the indication of the user-generated annotation meta-data contained in the popup display window from within the second document.

The information management system identifies the original source document, and the intermediary document(s) the selected critical information came from last (if any), via a unique document identifier for the respective document. In the preferred embodiment, the unique document identifier is a universally unique identifier (UUID) or a globally unique identifier (GUID) comprising a multi-bit number generated according to known techniques. In one embodiment, the data structure of the provenance meta-data contains a file path and/or a uniform resource locator (URL) for the uniquely identified source document of the selected critical information, and a file path and/or a URL for the uniquely identified intermediary document(s) from which the critical information was last referenced (if any).

When the system user copies and pastes the selected critical information from the second document to a third document, the system automatically updates the region-level meta-data describing the provenance of the selected critical information, propagates the updated provenance meta-data from the second document to the third document, and stores the provenance meta-data in at least one respective meta-data field embedded within the third document. It is noted that the system also causes the annotation meta-data optionally entered by the user to propagate from the second document to the third document for subsequent storage in at least one respective meta-data field embedded within the third document. With respect to the third document, the data structure of the provenance meta-data contains a file path and/or a URL for the uniquely identified source document of the selected critical information, and a file path and/or a URL for the uniquely identified second document from which the critical information was last referenced. In the preferred embodiment, the third document stores the meta-data describing the provenance of the selected critical information, while the second document retains the corresponding provenance meta-data appropriate for that document, i.e., the provenance meta-data is not deleted from its meta-data field location(s) within the second document. In this way, the system creates a provenance trail as critical information is copied-and-pasted or otherwise moved from one document to another.

By automatically annotating information such as critical constants or key calculations with meta-data describing the provenance of the information as it is copied-and-pasted or otherwise moved from one document to another, multiple documents containing the critical information can automatically acquire provenance meta-data for that information. System users who rely on such critical information can then access the provenance meta-data associated therewith to obtain an increased level of confidence in the integrity of the information.

Other features, functions, and aspects of the invention will be evident from the Detailed Description of the Invention that follows.

BRIEF DESCRIPTION OF THE SEVERAL VIEWS OF THE DRAWINGS

The invention will be more fully understood with reference to the following Detailed Description of the Invention in conjunction with the drawings of which.

DETAILED DESCRIPTION OF THE INVENTION

Figure 1:
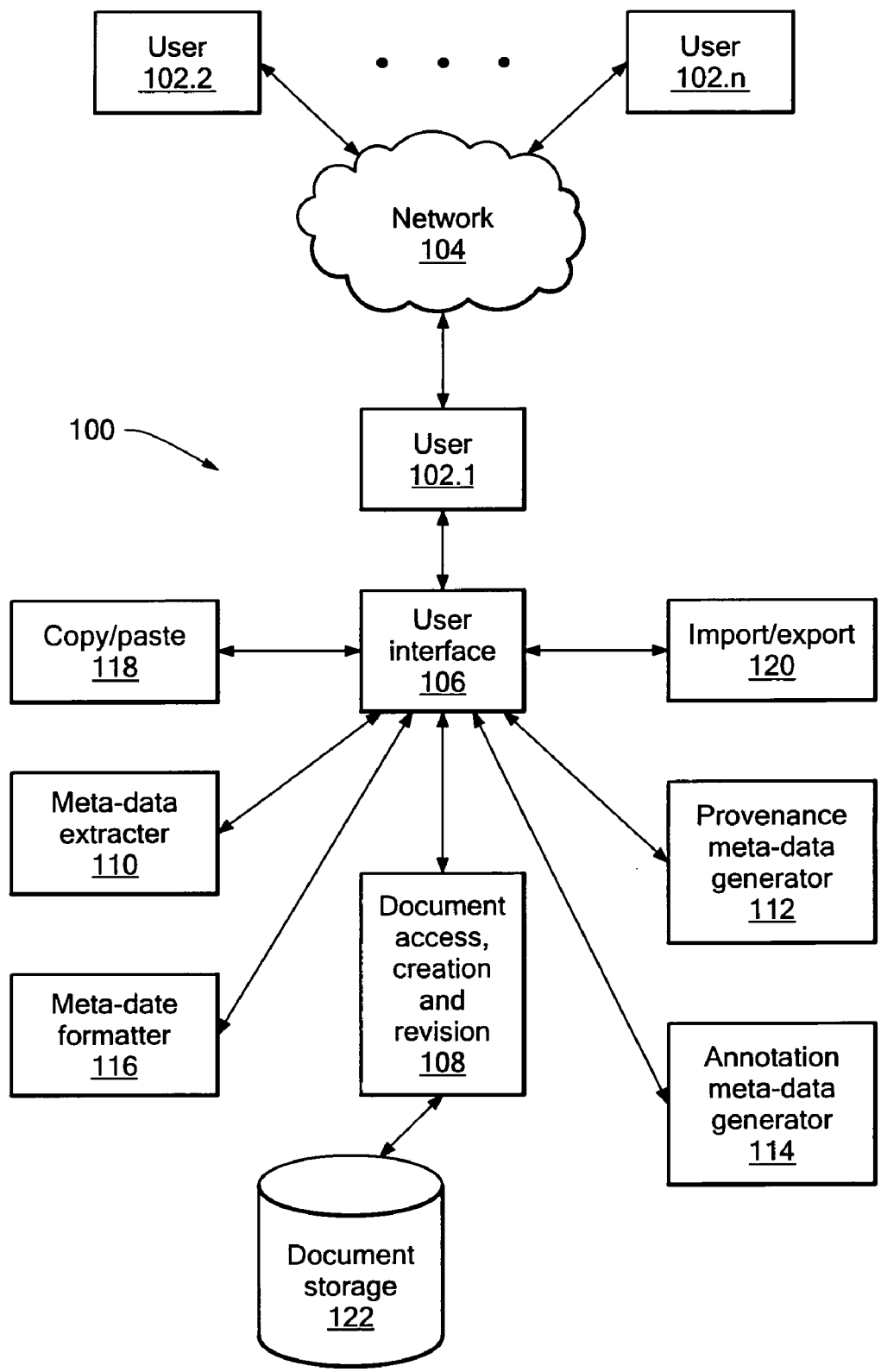
FIG. 1 is a block diagram of an information management system according to the present invention.

U.S. Provisional Patent Application No. 60/550,125 filed Mar. 4, 2004 entitled A METHOD FOR AUTOMATICALLY ENABLING TRACEABILITY OF ENGINEERING CALCULATIONS is incorporated herein by reference.

An improved method and system for managing the traceability of numerical, alphabetical, alphanumeric, character, or string entities such as critical constants or key calculations, equations, functions, procedures, or other information are disclosed. The presently disclosed information management system automatically generates meta-data describing the provenance of such critical information, embeds the provenance meta-data within one or more documents containing the critical information, and propagates the provenance meta-data along with the information as it is copied, moved, modified, and/or re-used.

In a preferred embodiment, the improved information management system is implemented on a computer system configurable to allow a user to create documents such as worksheets, spreadsheets, data files, media files, or program files, to enter information such as critical constants or key calculations into the documents, and to optionally enter annotation meta-data relating to the critical information. The computer system is further configurable to automatically generate meta-data describing the provenance of the critical information entered by the user, to embed the system-generated provenance meta-data and the optional user-generated annotation meta-data within the document or documents containing the critical information, and to propagate the provenance meta-data and the optional annotation meta-data along with the critical information as it is copied-and-pasted or otherwise moved from one document to another.

In the presently disclosed embodiment, the computer system includes a data storage system, at least one processor, one or more input devices such as a mouse and a keyboard, and at least one output device such as a video monitor or display. The data storage system includes at least one memory such as ROM or RAM for maintaining and storing the system-generated provenance meta-data and the optional user-generated annotation meta-data using a predetermined data structure. The processor is operative to execute at least one software program out of the memory for automatically generating the provenance meta-data for the critical information, and for embedding appropriate provenance meta-data within each document containing that information. In an alternative embodiment, the software program executed by the processor is encoded on a computer readable medium such as a CD-ROM, a hard disk, or a floppy disk. For example, the software program can be implemented using the JAVA programming language, the C++ programming language, or any other suitable programming language. The user can access the system-generated provenance meta-data and the optional user-generated annotation meta-data for the critical information by viewing representations of the critical information on the video display, and by "clicking" on the representation of the information using the mouse, to generate a popup display window containing indications of the provenance meta-data and the optional annotation meta-data for that information. By automatically annotating critical information with meta-data describing the provenance of the information as it is copied-and-pasted or otherwise moved from one document to another, the presently disclosed information management system automatically creates a provenance trail for the critical information, thereby providing the system user with an increased level of confidence in the integrity of the information.

FIG. 1 depicts an illustrative embodiment of an information management system 100, in accordance with the present invention. In the illustrated embodiment, the information management system 100 is employed within a collaborative environment, in which a plurality of users 102.1-102.$n$ communicate and interact with one another via at least one public or private telecommunications network such as a network 104. It is understood that each one of the users 102.1-102.$n$ is a separate computer system operable by a human operator, communicably coupleable to the network 104, and operative to perform the functions of the information management system 100. FIG. 1 depicts only the user 102.1 communicably coupled to the functional components of the information management system 100 for clarity of illustration, however, in practice, such components are replicated for each user.

As shown in FIG. 1, the user 102.1 communicates with the functional components of the information management system 100 via a user interface 106. Specifically, the user interface 106 implements a graphical user interface (GUI) for allowing a human operator to control the operation of the system 100 via one or more input devices such as a mouse and a keyboard, and to view document contents and related meta-data and graphical representations of document dependency relationships via at least one output device such as a video monitor or display. To that end, the user interface 106 enables the user 102.1 to access the plurality of functional components of the system, including a functional component 108 relating to document access, creation, and revision, a meta-data extractor 110, a provenance meta-data generator 112, an annotation meta-data generator 114, a meta-data formatter 116, a functional component 118 relating to copy-and-paste operations, and a functional component 120 relating to import and export operations.

The document access, creation, and revision component 108 is operative to enable the user 102.1 to access at least one selected document from a local document storage 122 or from a remote document storage accessible over the network 104, to create a new document, and to generate at least one new version of an existing document. For example, the document may comprise a worksheet, a spreadsheet, a table, a data file, a media file, a software program, or any other suitable document or information storage entity. In the preferred embodiment, the format of the document is based on the extended Markup Language (XML). Further, each XML-based document can have a plurality of meta-data fields embedded within or otherwise incorporated into the document for storing provenance meta-data and other annotation meta-data relating to respective regions and/or sub-regions of the document. It is understood that each region or sub-region of the document corresponds to information such as critical constants or key calculations within the document.

In addition, the functional component 108 is operative to generate a unique document identifier for each newly created document and for each document version. In the preferred embodiment, the unique document identifier is a universally unique identifier (UUID) or a globally unique identifier (GUID) comprising a multi-bit number (e.g., 64 or 128 bits) generated as known in the art, e.g., as disclosed in P. Leach and R. Salz, "UUID and GUIDs", Internet Engineering Task Force (IETF), document identifier draft-leach-uuids-guids-01.txt, 4 Feb. 1998, expired, which is incorporated herein by reference. In alternative embodiments, the unique document identifier may comprise a UUID, a GUID, a checksum, a hash code, a digital signature, and/or any other suitable numerical, alphabetical, alphanumeric, character, or string entity for uniquely identifying a document. Moreover, in the preferred embodiment, each unique document identifier is generated based on the contents of the corresponding document. More specifically, the unique document identifier for a particular document preferably comprises a UUID, a GUID, a checksum, a hash code, a digital signature, and/or any other suitable entity generated from the contents of the document. As a result, if two or more documents have the same document identifier, then the contents of the respective documents are identical. In this way, the system user can more easily verify or validate the information contained within a document. It is noted that a document can include a checksum, a hash code, and/or a digital signature within its contents, and therefore a checksum, a hash code, or a digital signature generated for identifying the document would incorporate the checksum, the hash code, and/or the digital signature included therein.

The information management system 100 is operative to access meta-data embedded within a selected document, and to generate meta-data for subsequent storage in respective meta-data fields associated with the selected document. To that end, the meta-data extractor 110 is operative to extract the meta-data currently stored in respective ones of the meta-data fields, and to provide the extracted meta-data to the user interface 106 for displaying representations of the meta-data via one or more GUI windows on the video display. Further, the annotation meta-data generator 114 is operative to enable the user 102.1 to optionally enter annotation meta-data relating to the critical information contained within the selected document, and to store the optional annotation meta-data in at least one meta-data field embedded within the selected document. In the presently disclosed embodiment, the user-generated annotation meta-data comprises text-based annotation meta-data.

The functional components 118 and 120 relating to the copy-and-paste operations and the import and export operations enable the user 102.1 to take a copy of the critical information out of a selected document for inclusion in another document, and to receive new information from another document for inclusion in the selected document. Whenever such information is copied or exported from the selected document and pasted or imported to a destination document, the provenance meta-data generator 112 is operative to automatically generate region-level meta-data describing the provenance of the information. Next, the system 100 causes the provenance meta-data associated with the information to propagate to the destination document for subsequent storage in at least one respective meta-data field embedded within the destination document. Similarly, the system 100 causes any user-generated annotation meta-data associated with the information to propagate from the selected document to the destination document for subsequent storage in at least one meta-data field embedded within the destination document. It is noted that while performing the copying and pasting operations, the system 100 generates the provenance meta-data and propagates the system-generated provenance meta-data and the optional user-generated annotation meta-data from the selected document to the destination document using the system clipboard.

Figure 2:
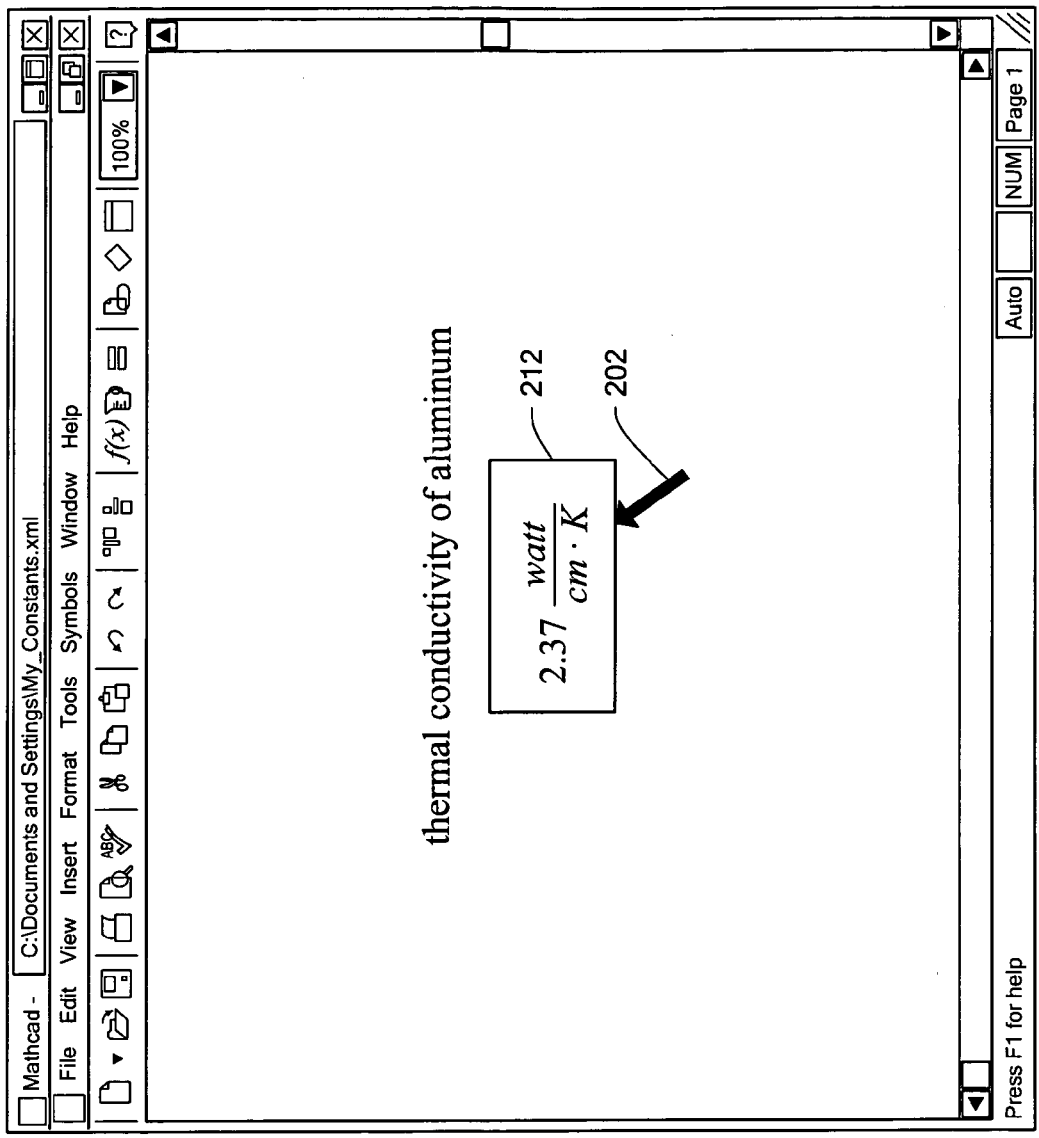
FIGS. 2-6 are display windows of a first illustrative session in which the system of FIG. 1 is employed.

The presently disclosed information management system 100 (see FIG. 1) will be better understood with reference to the following illustrative examples and FIGS. 2-8. In a first example, a user employs the information management system to create a first data file "My_Constants" in the XML document format. In this example, the first data file My_Constants is a worksheet for storing engineering content such as critical constants. FIG. 2 depicts a portion of the engineering content stored in the worksheet My_Constants, as displayed on a video monitor included in the system. The worksheet is stored on a hard disk of the user's computer system at a location specified by a file path "C:\Documents and Settings\My_Constants.xml", as shown in FIG. 2. At the time of creation of the worksheet My_Constants, the system automatically generates a unique document identifier for the worksheet, such as a GUID. The worksheet My_Constants is configured to store critical constants, e.g., the thermal conductivity of aluminum, and to allow the user to enter the value $$"2.37 \frac{watt}{cm \cdot K}"$$

for the thermal conductivity of aluminum in a field 212 of the worksheet via the system keyboard. The worksheet My_Constants is therefore the original source document for the critical constant $$2.37 \frac{watt}{cm \cdot K}.$$

It is noted that each critical constant stored in the worksheet My_Constants corresponds to a respective sub-region of the worksheet.

Figure 3:
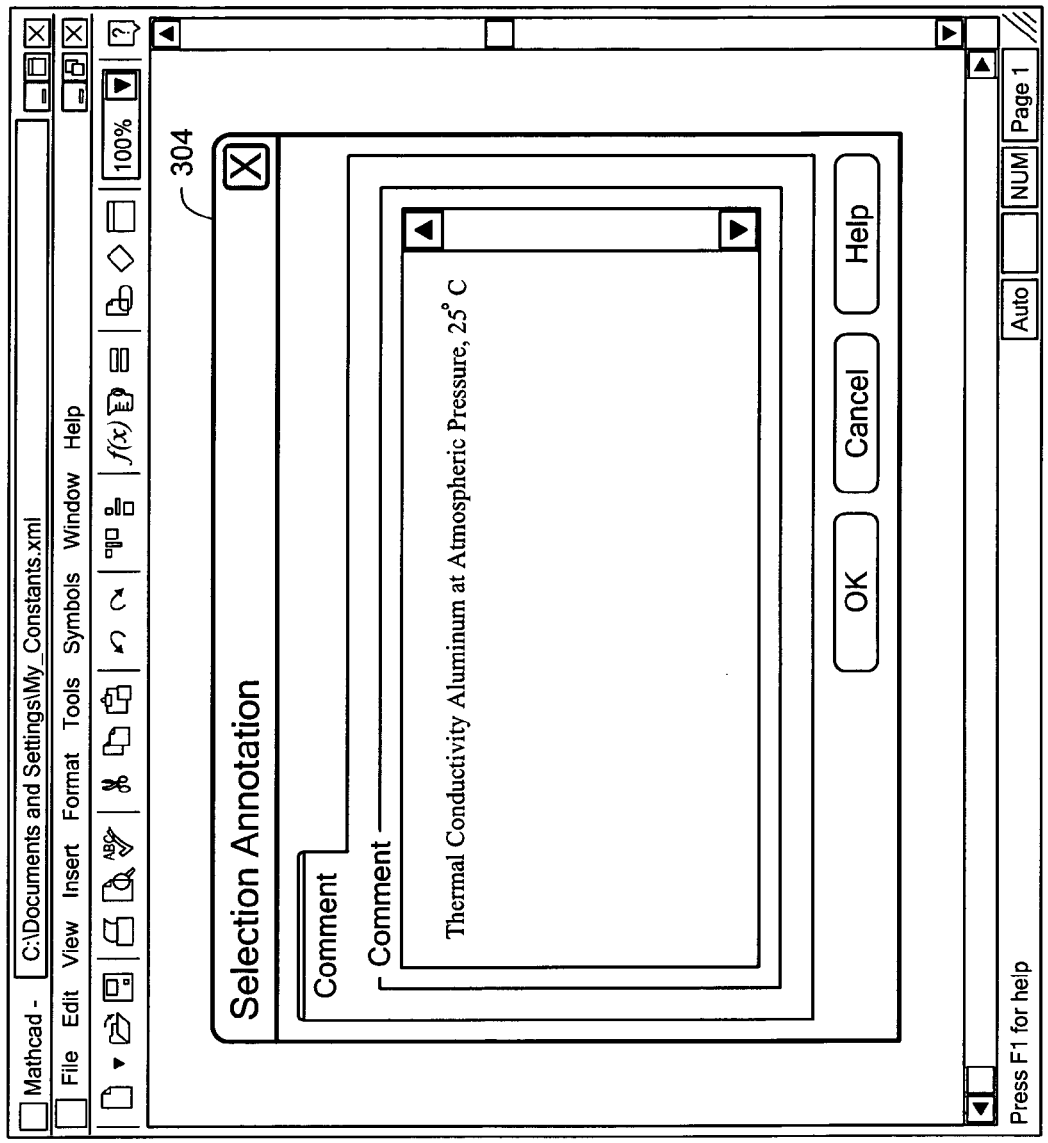

The worksheet of FIG. 2 can have a plurality of meta-data fields embedded therein for storing annotation meta-data relating to the critical constants stored in the worksheet. To access the annotation meta-data fields relating to the constant $$2.37 \frac{watt}{cm \cdot K},$$

the user employs the system mouse to move a cursor 202 substantially over the field 212, and "clicks" the mouse to select the field 212 and to cause a popup display window 304 (see FIG. 3) to be displayed on the video monitor. As shown in FIG. 3, the display window 304 includes a "Comment" region in which the user can optionally enter one or more comments relating to the constant $$2.37 \frac{\text{watt}}{\text{cm} \cdot K}$$

via the keyboard. In this example, the user enters the comment "Thermal Conductivity Aluminum at Atmospheric Pressure, 25° C." in the Comment region of the display window 304. It is noted that this comment comprises user-generated annotation meta-data, which is stored in a corresponding meta-data field embedded within the worksheet My_Constants.

Next, the user employs his or her computer system to access a second XML-based document at URL "http://rocket2:80/mcd_data/data.xml". For example, the user's computer system may be coupled to a private or public telecommunications network such as the network 104 (see FIG. 1), thereby allowing the user to access the second document from a remote document storage over the network. It is understood that this second document was also created using the information management system by the same user or a different user, and therefore has a corresponding unique document identifier such as a GUID. It is noted that the file path C:\Documents and Settings\My_Constants.xml (1)

and the URL http://rocket2:80/mcd_data/data.xml (2)

effectively function as overlays of the GUIDs corresponding to the respective documents.

Figure 4:
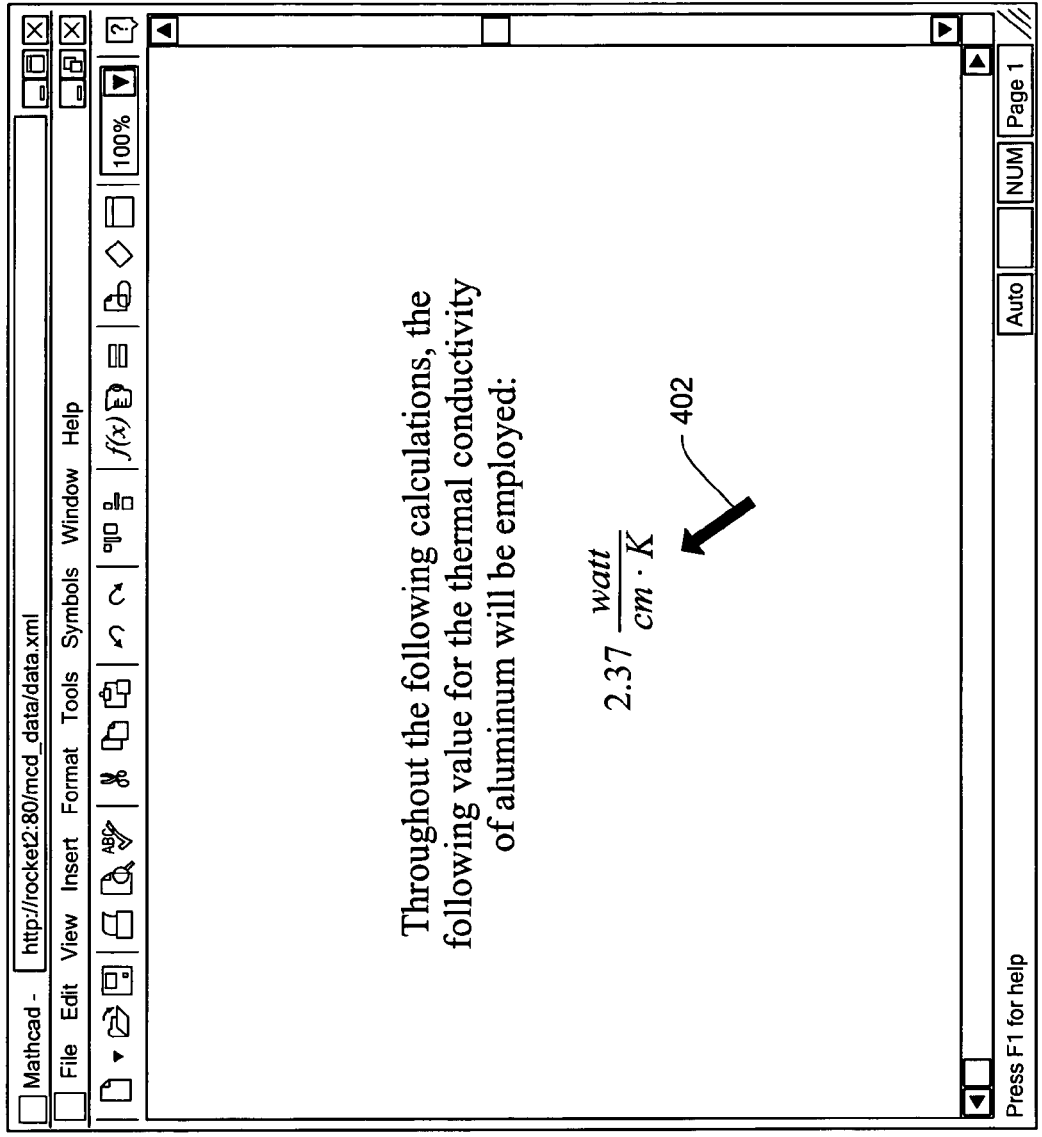

FIG. 4 depicts a portion of the content stored in the second document, as displayed on the system video monitor. In this first example, the user employs the information management system to enter the text "Throughout the following calculations, the following value for the thermal conductivity of aluminum will be employed:" in the second document, and to copy and paste the constant $$2.37 \frac{\text{watt}}{\text{cm} \cdot K}$$

from the original worksheet (see FIG. 2) to the second document (see FIG. 4). Further, while performing the copying and pasting operations, the system automatically generates meta-data describing the provenance of the constant $$2.37 \frac{\text{watt}}{\text{cm} \cdot K},$$

and automatically propagates the system-generated provenance meta-data and the optional user-generated comments (see FIG. 3) from the original worksheet to the second document using the system clipboard for subsequent storage in respective meta-data fields embedded within the second document. To access the meta-data fields relating to the constant $$2.37 \frac{\text{watt}}{\text{cm} \cdot K},$$

the user again employs the mouse to move a cursor 402 substantially over an active display region including a representation of constant $$2.37 \frac{\text{watt}}{\text{cm} \cdot K},$$

and "clicks" the mouse to select the constant and to cause a popup display window 504 (see FIG. 5) to be displayed on the video monitor.

Figure 5:
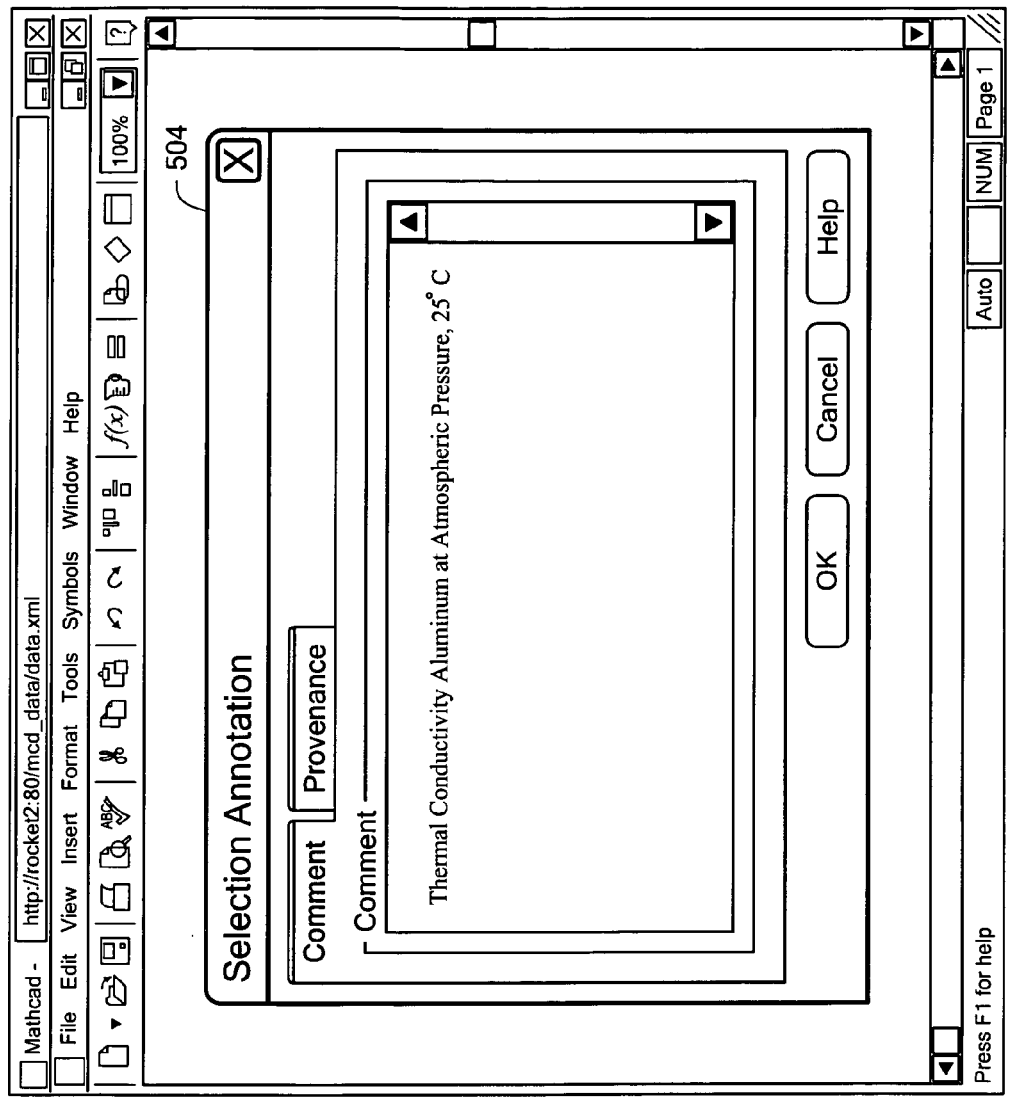
Figure 6:
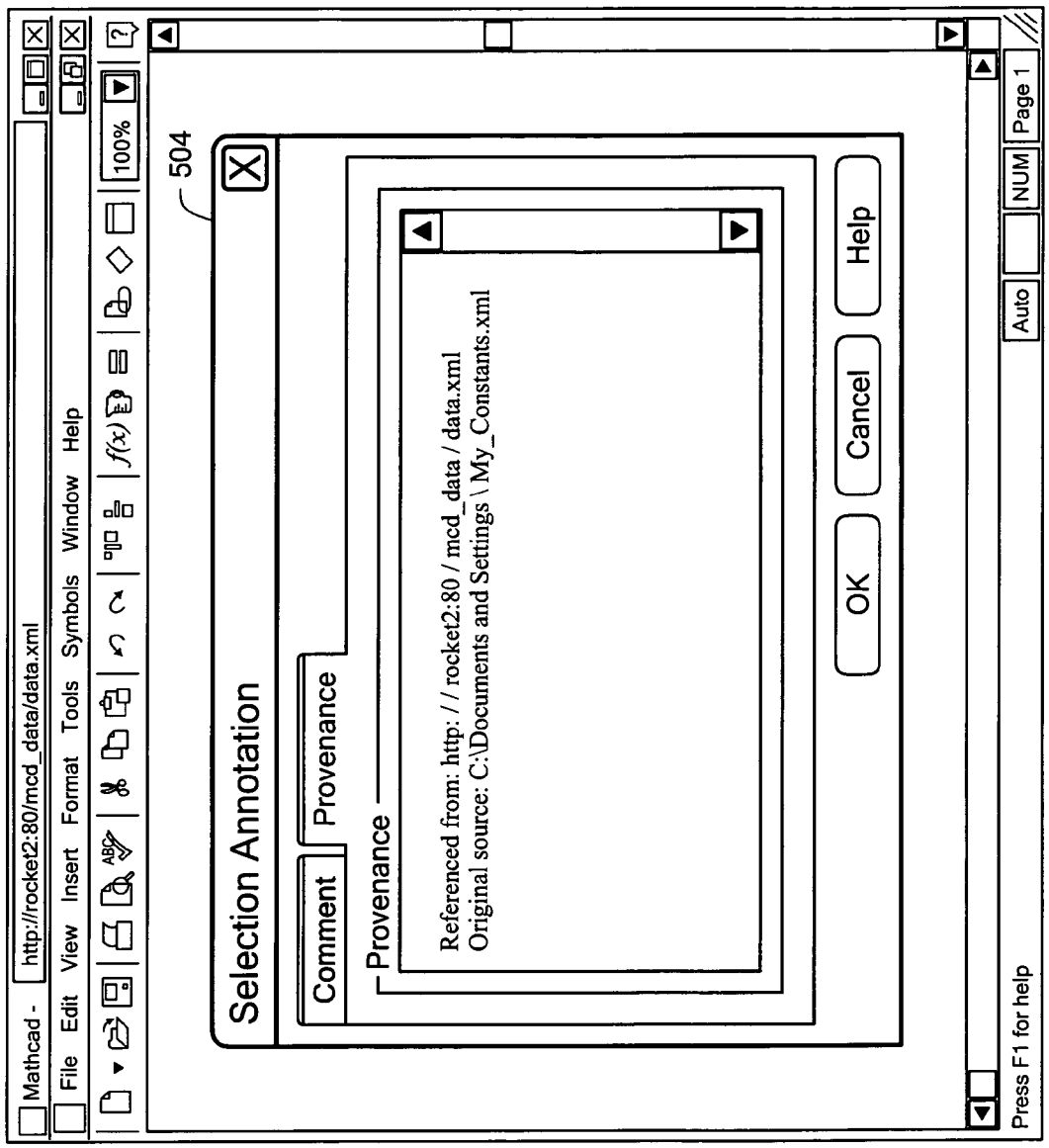

As shown in FIG. 5, the display window 504 of this example includes two tabs labeled "Comment" and "Provenance". The user accesses the annotation meta-data relating to the comments by clicking on the Comment tab, causing the comment "Thermal Conductivity Aluminum at Atmospheric Pressure, 25° C." to be displayed within the display window 504. As described above, this comment was originally entered by the user into the worksheet, which is the original source document for the value $$2.37 \frac{\text{watt}}{\text{cm} \cdot K}$$

of the thermal conductivity of aluminum. In the preferred embodiment, the system does not allow the user to modify the annotation meta-data displayed in the Comment region of the display window 504 from within the second document.

Next, the user accesses the provenance meta-data by clicking on the Provenance tab, causing the provenance meta-data "Referenced from: http://rocket2:80/mcd_data/data.xml Original source: C:\Documents and Settings\My_Constants.xml" to be displayed within the Provenance region of the display window 504 (see FIG. 6). As described above, this provenance meta-data was automatically generated by the system using the clipboard during the copying and pasting operations. Via the display window 504, the user can therefore identify both the document that last referenced the constant $$2.37 \frac{\text{watt}}{\text{cm} \cdot K},$$

(in this example, the second document) and the original source document of the constant $$2.37 \frac{\text{watt}}{\text{cm} \cdot K}$$

(in this example, the original worksheet). It should be appreciated that the system does not allow any user to modify the provenance meta-data displayed in the Provenance region of the display window 504, thereby assuring that the user has a high level of confidence in the integrity of the critical information contained within the second document. It should also be understood that the user-generated annotation meta-data displayed in the Comment region of the display window 504 is merely optional, and that the system does not require the user to enter such annotation meta-data to generate the provenance meta-data for the critical information.

Figure 7:
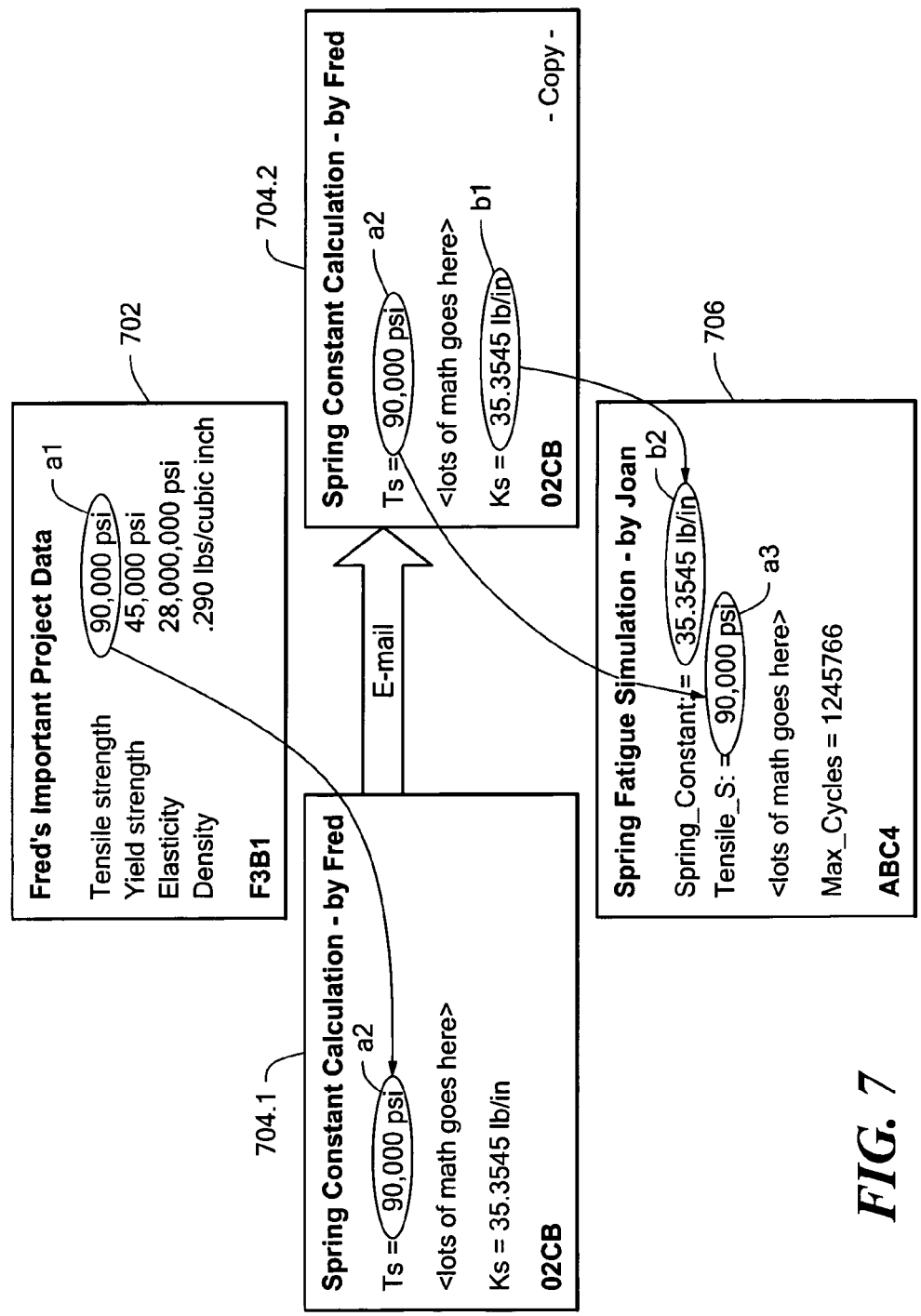
FIGS. 7-8 are block diagrams representing a second illustrative session in which the system of FIG. 1 is employed.

In a second example, the presently disclosed information management system is employed by a group of users (e.g., engineers) to design a new coil spring. FIG. 7 depicts a number of documents 702, 704.1-704.2, and 706 created by the engineers via the information management system during the coil spring design project. At the time of creation of the documents 702, 704.1-704.2, and 706, the system automatically generates unique document identifiers such as GUIDs for the respective documents. For example, the document 702 has a unique document identifier "F3B1", the documents 704.1-704.2 have a document identifier "02CB", and the document 706 has a unique document identifier "ABC4". As described above, in the preferred embodiment, if two or more documents have the same document identifier, then the contents of the respective documents are identical. Accordingly, because the documents 704.1-704.2 have the same document identifier "02CB", the contents of the respective documents 704.1-704.2 are identical, and the document 704.2 merely represents a copy of the document 704.1. It should be appreciated that if the document 704.2 were a newly created document or a new version of the document 704.1, then the document 704.2 would have its own unique document identifier different from that of document 704.1.

In this second example, a first user ("Fred") uses the information management system to enter some critical information (e.g., MIL STD 4564 steel properties designated as "Fred's Important Project Data") relating to tensile strength, yield strength, elasticity, and density into the document 702. Fred then uses the system to create the document 704.1, which he uses to calculate the spring constant "Ks" for the coil spring. As illustrated in FIG. 7, Fred copies and pastes the critical information relating to tensile strength ("90,000 psi") from the document 702 to the document 704.1. Next, Fred e-mails the document 704.1 to a second user ("Joan"), thereby providing Joan with the copy 704.2 of the document 704.1. Joan then employs the system to create the document 706, which she uses to perform a simulation of the coil spring fatigue. As illustrated in FIG. 7, Joan copies and pastes the critical information relating to the tensile strength "Ts" (90,000 psi) and the calculated spring constant Ks ("35.3545 lb/in") from the document 704.2 to the document 706.

Accordingly, this second example involves the following critical information: "Tensile strength 90,000 psi" in document 702 (designated as critical constant "a1"), "Ts=90,000 psi" in documents 704.1-704.2 (designated as critical constant "a2"), "Ks=35.3545 lb/in" in document 704.2 (designated as critical calculation "b1"), "Spring_Constant:=35.3545 lb/in" in document 706 (designated as critical calculation "b2"), and "Tensile_S:=90,000 psi" in document 706 (designated as critical constant "a3"). It is noted that each one of the documents 702, 704.1-704.2, 706 has embedded meta-data corresponding to user-generated comments and/or the provenance of selected ones of the critical constants/calculations a1-a3, b1-b2.

The meta-data for the constants/calculations a1-a3, b1-b2 include the information listed in the TABLE below,

TABLE

| Critical info | Source | | | Referenced from |
|---|---|---|---|---|
| | Comment | Document identifier | Info type | |
| a1 | MIL STD 4564 Steel Properties | F3B1 | Constant | None |
| a2 | MIL STD 4564 Steel Properties | F3B1 | Constant | F3B1 |
| b1 | Output Ks | 02CB | Result | None |
| b2 | Output Ks | 02CB | Result | 02CB |
| a3 | MIL STD 4564 Steel Properties | F3B1 | Constant | 02CB | in which "Critical info" are the critical information designations for this example, "Source" identifies the original source document of the critical information, "Info type" indicates the type of critical information (e.g., a critical constant or a calculation result), and "Referenced from" identifies the document in which the critical information was last referenced from, if any (in this example, each document is identified by a GUID). As indicated in the TABLE, the "Source" information includes a "Comment", which is generated by the user within the original source document of the respective critical information, and the "Document identifier" of the original source document, which in this example is a GUID.

Figure 8:
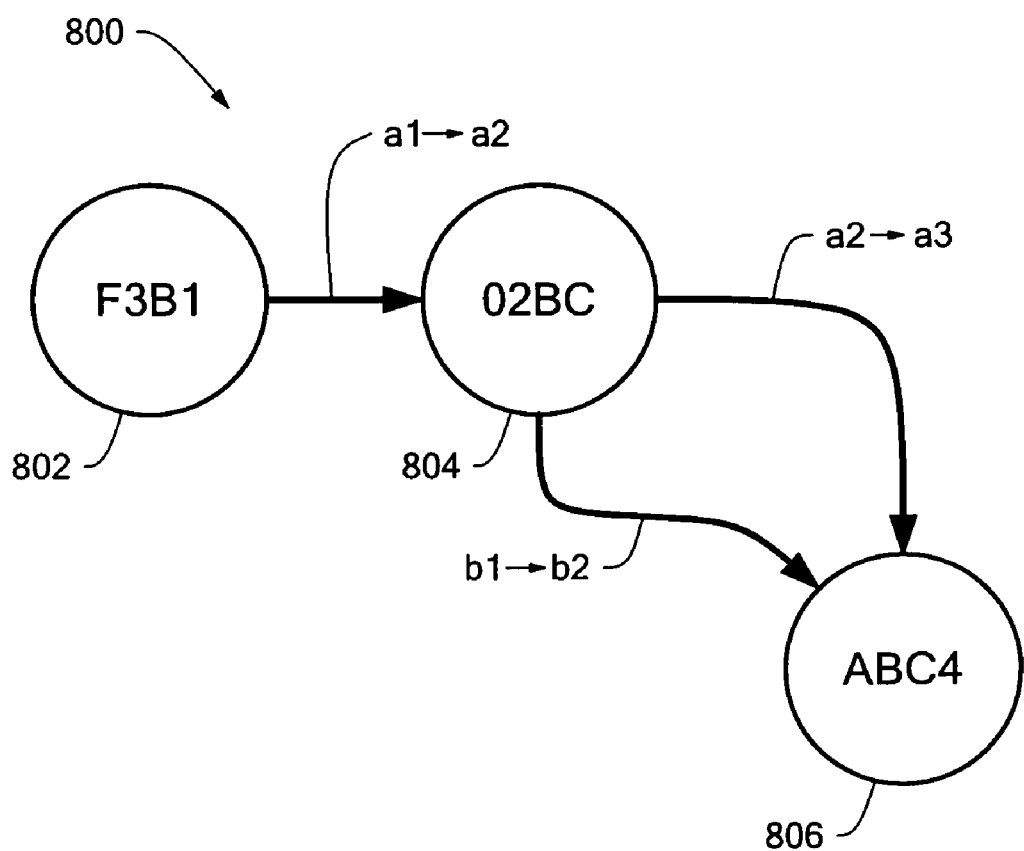

FIG. 8 depicts a dependency graph 800 including multiple symbolic document representations 802, 804, and 806, in which the symbol 802 represents the document 702, the symbol 804 represents the documents 704.1-704.2, and the symbol 806 represents the document 706 (see also FIG. 7). The documents 702, 704.1-704.2, 706 represented by the symbols 802, 804, and 806 in the dependency graph 800 are referred to herein as dependent documents. As described above, the document 704.2 (GUID=02CB) is a copy of the document 704.1 (GUID=02CB), and therefore the respective contents of the documents 704.1-704.2 are identical. The dependency graph 800 is constructed based on the information contained in the TABLE above. Using the dependency graph 800, the system user can visually track where the critical information within the documents 702, 704.1-704.2, and 706 originally came from, and which intermediary document(s) the critical information came from last (if any). For example, the user can view a representation of the dependency graph 800 on the system video display to track the critical constant a3 from the symbol 806 (representing the document 706; GUID=ABC4) to the symbol 804 (representing the identical intermediary documents 704.1-704.2; GUID=02CB), in which it has the designation a2. Further, the user can track the critical constant a2 from the symbol 804 (representing the identical intermediary documents 704.1-704.2; GUID=02CB) to the symbol 802 (representing the document 702; GUID=F3B1), in which it has the designation a1. Similarly, the user can track the calculation result b2 from the symbol 806 (representing the document 706; GUID=ABC4) to the symbol 804 (representing the identical intermediary documents 704.1-704.2; GUID=02CB), in which it has the designation b1. The user can also access the provenance meta-data for the critical information a1-a3, b1-b2 embedded within the respective documents 702, 704.1-704.2, 706 including any corresponding user-generated annotation meta-data by "clicking" on the symbolic document representations 802, 804, and 806 to generate a popup display window containing indications of the provenance meta-data and the optional user-generated annotation meta-data for that information. By visually tracking the critical information a1-a3, b1-b2 using the dependency graph 800, and by accessing the provenance meta-data for the critical information a1-a3, b1-b2 embedded within the respective documents 702, 704.1-704.2, 706, a complete provenance trail for each one of the information entities a1-a3, b1-b2 can be generated.

Figure 9:
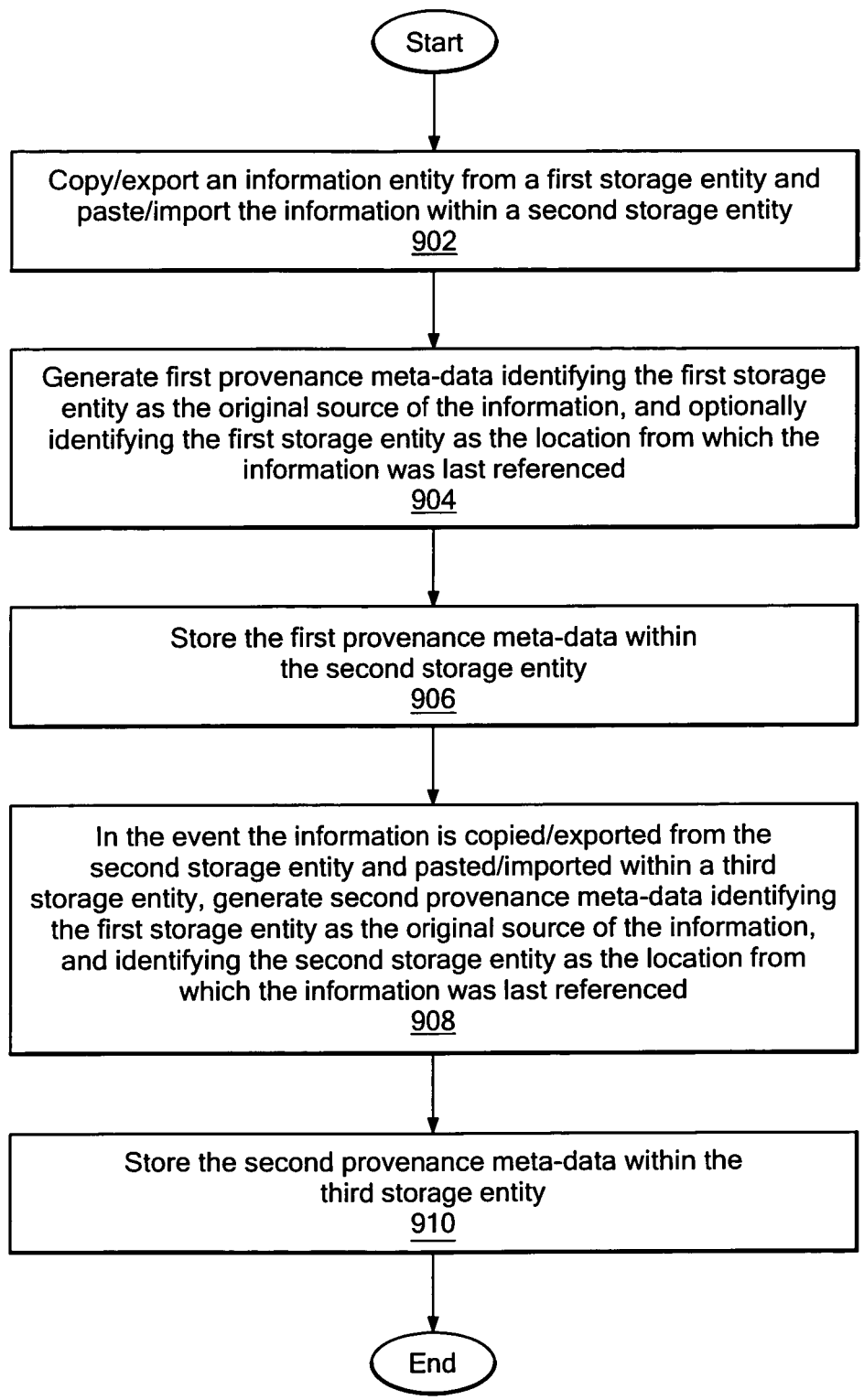
FIG. 9 is a flow diagram of a method of operating the system of FIG. 1.

A method of operating the presently disclosed information management system is illustrated by reference to FIG. 9. As depicted in step 902, an information entity such as a critical constant or key calculation is copied/exported from a first storage entity (e.g., a first document) and pasted/imported within a second storage entity (e.g., a second document), in which the first and second storage entities are respective documents, worksheets, spreadsheets, tables, data files, media files, or software programs. Next, as depicted in step 904, first meta-data describing the provenance of the critical information is generated, in which the first meta-data comprises a data structure including a first portion having first data identifying the first storage entity as the original source of the critical information, and optionally including a second portion having second data identifying the first storage entity as the location from which the critical information was last referenced. As depicted in step 906, the first meta-data is then stored within the second storage entity. In the event the critical information is copied/exported from the second storage entity and pasted/imported within a third storage entity (e.g., a third document) such as a document, a worksheet, a spreadsheet, a table, a data file, a media file, or a software program, second meta-data describing the provenance of the critical information is generated, as depicted in step 908, in which the second meta-data comprises a data structure including a first portion having first data identifying the first storage entity as the original source of the critical information, and a second portion having second data identifying the second storage entity as the location from which the critical information was last referenced. The second meta-data is then stored, as depicted in step 910, within the third storage entity.

Having described the above illustrative embodiments, other alternative embodiments or variations may be made. For example, it was described that when critical information such as a critical constant or key calculation is copied or exported from one location to another location, the information in the provenance meta-data relating to the document or location from which that constant or calculation was last referenced is effectively replaced by new information describing the document or location from which the constant or calculation is being transferred. However, in alternative embodiments, the number of levels of history of the critical information being operated on may vary. For example, the provenance data structure may be configured to store multiple levels of secondary or intermediary source information for the critical constant or key calculation, thereby enhancing the traceability of the constant or calculation.

In addition, it should be understood that the presently disclosed information management system and method may be employed in conjunction with calculation tools, spreadsheet applications, and any other suitable tools or applications that receive documents comprising, e.g., worksheets, spreadsheets, tables, data files, media files, software programs, constants, or calculation results as inputs, operate on or otherwise manipulate the content of such documents, and generate such documents or calculation results as outputs.

The presently disclosed information management system allows a user to determine the original source of each numerical quantity and information entity used, calculated, or otherwise derived in a given document, worksheet, spreadsheet, table, file, or program. Further, the disclosed system allows the user to generate complete dependency graphs for each numerical quantity and information entity, and to trace each quantity or entity through the graph in any desired direction. Moreover, the disclosed system enables the user to execute various change scenarios. For example, in the event the user changes a particular numerical quantity in one document, the system is operative to propagate the changed quantity to each appropriate dependent document represented in the corresponding dependency graph. In one embodiment, the system creates a new version of each appropriate dependent document, substituting the changed quantity for the original numerical quantity, recalculates each quantity that depends upon the changed quantity within the new document versions, and propagates the new calculation results to each document depending upon these results. In an alternative embodiment, the system substitutes the changed quantity for the original quantity within the dependent document, and recalculates each quantity dependent upon the changed quantity within the dependent document. The system is further operative to generate provenance meta-data for each particular numerical quantity or other critical information within the new document versions, and to display a dependency graph including representations of the new document versions, thereby providing a complete revision tree for the respective documents. The system accomplishes these tasks via the provenance meta-data embedded within the respective documents, which assure the traceability of each changed or recalculated quantity through multiple documents. Having the ability to trace numerical quantities and other information entities through multiple documents also makes it easier to search documents to determine which ones use a particular quantity or entity. Such searching is also facilitated by the presently disclosed technique of uniquely identifying the various documents, worksheets, spreadsheets, tables, data files, media files, and software programs handled by the system.

It will further be appreciated by those of ordinary skill in the art that modifications to and variations of the above-described method and system for automatically enabling the traceability of engineering calculations may be made without departing from the inventive concepts disclosed herein. Accordingly, the invention should not be viewed as limited except as by the scope and spirit of the appended claims.

What is claimed is:

1. A computer implemented method of managing and maintaining traceability of information as the information is provided to a plurality of information storage entities, the method comprising the steps of:

storing, by a first device, first information in a first information storage entity, the first information comprising information for which provenance is desired;

generating first provenance meta-data indicating the provenance of the first information stored in the first information storage entity, the first provenance meta-data having a data structure for defining the provenance of the first information, the data structure including at least a first portion including an indication of an original source information storage entity of the first information, and a second portion including an indication of an intermediary information storage entity from which the first information was last provided;

incorporating the first provenance meta-data into the first information storage entity;

in response to a predetermined user-initiated action:
storing at least one representation of the first information stored in the first information storage entity in a second information storage entity; and
automatically updating the first provenance meta-data, the updated first provenance meta-data having the data structure including at least the first portion including the indication of the original source information storage entity of the first information, and the second portion including the indication of the intermediary information storage entity from which the first information was last provided,
wherein the first information storage entity is indicated in the updated first provenance meta-data as the intermediary information storage entity;

in response to the predetermined user-initiated action to store the representation of the first information in the second information storage entity, propagating the updated first provenance meta-data to the second information storage entity for storage in the second information storage entity;

modifying the first information within the first information storage entity;

determining a presence of the at least one representation of the first information within the second information storage entity using the updated first provenance meta-data;

in response to the determination of the presence of the at least one representation of the first information within the second information storage entity using the updated first provenance meta-data, substituting a representation of the modified first information for the representation of the first information within the second information storage entity, wherein the second information storage entity includes a representation of at least one calculated quantity;

recalculating each calculated quantity within the second information storage entity that depends upon the modified first information; and substituting a representation of the recalculated quantity for the representation of the calculated quantity within the second information storage entity.

2. The method of claim 1 wherein the first information is selected from the group consisting of a numerical entity, an alphabetical entity, an alphanumeric entity, a character, a string, a constant, a calculation, an equation, a function, and a procedure.

3. The method of claim 1 wherein the first information storage entity and the second information storage entity are selected from the group consisting of a document, a worksheet, a spreadsheet, a table, a data file, a media file, and a software program.

4. The method of claim 1 wherein the first information storage entity and the second information storage entity comprise respective documents in the extended markup language (XML) document format.

5. The method of claim 1 further including the steps of generating second meta-data associated with the first information, and incorporating the second meta-data into the second information storage entity.

6. The method of claim 5 further including storing the first provenance meta-data and the second meta-data within the data structure.

7. The method of claim 6 wherein the incorporating step includes incorporating a representation of the data structure containing the first provenance meta-data and the second meta-data into the second information storage entity.

8. The method of claim 5 wherein the second meta-data is generated by a human operator.

9. The method of claim 1 wherein the predetermined user-initiated action includes copying the first information from the first information storage entity, and pasting the first information into the second information storage entity.

10. The method of claim 9 wherein the steps of copying and pasting employ a clipboard.

11. The method of claim 10 wherein the generating step includes generating the first provenance meta-data using the clipboard.

12. The method of claim 1 wherein the predetermined user-initiated action includes cutting the first information from the first information storage entity, and pasting the first information into the second information storage entity.

13. The method of claim 1 wherein the predetermined user-initiated action includes exporting the first information from the first information storage entity, and importing the first information into the second information storage entity.

14. The method of claim 1 further including the step of generating a unique identifier for each one of the first and second storage entities.

15. The method of claim 14 wherein the first and second information storage entities comprise respective contents, and wherein the generating of the unique identifier includes generating unique identifiers for the first and second information storage entities based on the respective contents of the first and second information storage entities.

16. The method of claim 14 wherein the unique identifier is selected from the group consisting of a universally unique identifier (UUID), a globally unique identifier (GUID), a checksum, a hash code, and a digital signature.

17. The method of claim 1 further including the step of displaying a graphical representation of dependency relationships between the plurality of information storage entities.

18. The method of claim 17 wherein the graphical representation of dependency relationships includes symbols representing the respective information storage entities, representations of selected information within the information storage entities, and representations of interconnections between the storage entity symbols, and further including the step of visually indicating which information storage entities include representations of the selected information by a visual arrangement of the storage entity symbols, the representations of selected information, and the representations of interconnections between the symbols.

19. The method of claim 1 further including the steps of modifying the first information within the first information storage entity, determining a presence of the at least one representation of the first information within the second information storage entity using the updated first provenance meta-data, creating a new version of the second information storage entity including the at least one representation of the first information, and substituting a representation of the modified first information for the representation of the first information within the new version of the second information storage entity.

20. The method of claim 19 further including the step of generating a unique identifier for each one of the first information storage entity, the second information storage entity, and the new version of the second information storage entity.

21. The method of claim 1:
wherein the first device is coupled to at least one network; and
wherein the method further includes transmitting, over the network, the second information storage entity to at least one second device coupled to the network,
thereby propagating the updated first provenance meta-data within the second information storage entity with the first information as the second information storage entity is transmitted over the network.

22. The method of claim 1 wherein the original source information storage entity includes predetermined first content, and wherein the generating of the updated first provenance meta-data comprises:
obtaining a first identifier of the original source information storage entity, the first identifier being previously generated based on the predetermined first content of the original source information storage entity, and
determining the first portion of the data structure using the first identifier of the original source information storage entity.

23. The method of claim 22 wherein the determining of the first portion of the data structure comprises:
obtaining a file path for the original source information storage entity, the file path functioning as an overlay of the first identifier of the original source information storage entity; and
incorporating the file path into the first portion of the data structure.

24. The method of claim 22 wherein the determining of the first portion of the data structure comprises:
obtaining a uniform resource locator (URL) for the original source information storage entity, the URL functioning as an overlay of the first identifier of the original source information storage entity; and
incorporating the URL into the first portion of the data structure.

25. The method of claim 1 wherein the intermediary source information storage entity includes predetermined second content, and wherein the generating of the updated first provenance meta-data comprises:
obtaining, at least at some times, a second identifier of the intermediary source information storage entity, the second identifier being previously generated based on the predetermined second content of the intermediary source information storage entity, and
determining the second portion of the data structure using the second identifier of the intermediary source information storage entity.

26. The method of claim 25 wherein the determining of the second portion of the data structure comprises:
obtaining a file path for the intermediary source information storage entity, the file path functioning as an overlay of the second identifier of the intermediary source information storage entity; and
incorporating the file path into the second portion of the data structure.

27. The method of claim 25 wherein the determining of the second portion of the data structure comprises:
obtaining a uniform resource locator (URL) for the intermediary source information storage entity, the URL functioning as an overlay of the second identifier of the intermediary source information storage entity; and
incorporating the URL into the second portion of the data structure.

28. The method of claim 1 wherein the predetermined user-initiated action includes copying the first information from the first information storage entity onto a clipboard, and pasting the first information from the clipboard into the second information storage entity, and wherein the propagating of the updated first provenance meta-data to the second information storage entity includes propagating the updated first provenance meta-data to the second information storage entity via the clipboard.

29. An information management system that maintains traceability of information as the information is provided to a plurality of information storage entities, and as each of the plurality of information storage entities is transmitted from one device to at least one other device over at least one network, the system comprising:
at least one network; and
a plurality of devices coupled to the network, the plurality of devices including at least one first device and at least one second device,
wherein the first device is configured:
to store first information in a first information storage entity, the first information comprising information for which provenance is desired;
to generate first provenance meta-data indicating the provenance of the first information stored in the first information storage entity, the first provenance meta-data having a data structure for defining the provenance of the first information, the data structure including at least a first portion including an indication of an original source information storage entity of the first information, and a second portion including an indication of an intermediary information storage entity from which the first information was last provided;
to incorporate the first provenance meta-data into the first information storage entity;
in response to a predetermined user-initiated action:
to store, in a second information storage entity, at least one representation of the first information stored in the first information storage entity; and
to automatically update the first provenance meta-data, the updated first provenance meta-data having the data structure including at least the first portion including the indication of the original source information storage entity of the first information, and the second portion including the indication of the intermediary information storage entity from which the first information was last provided,
wherein the first information storage entity is indicated in the updated first provenance meta-data as the intermediary information storage entity;
to propagate, in response to the predetermined user-initiated action to store the representation of the first information in the second information storage entity, the updated first provenance meta-data to the second information storage entity for storage in the second information storage entity;
to modify the first information within the first information storage entity;
to determine a presence of the at least one representation of the first information within the second information storage entity using the updated first provenance meta-data;
in response to the determination of the presence of the at least one representation of the first information within the second information storage entity using the updated first provenance meta-data, to propagate a representation of the modified first information to the second information storage entity for substitution of the representation of the modified first information for the representation of the first information within the second information storage entity,
wherein the second information storage entity includes a representation of at least one calculated quantity;
to recalculate each calculated quantity that depends upon the modified first information; and
to propagate a representation of the recalculated quantity to the second information storage entity for substitution of the representation of the recalculated quantity for the representation of the calculated quantity within the second information storage entity.

30. The system of claim 29 wherein the first information is selected from the group consisting of a numerical entity, an alphabetical entity, an alphanumeric entity, a character, a string, a constant, a calculation, an equation, a function, and a procedure.

31. The system of claim 29 wherein the first information storage entity and the second information storage entity are selected from the group consisting of a document, a worksheet, a spreadsheet, a table, a data file, a media file, and a software program.

32. The system of claim 29 wherein the first device is further configured to generate a unique identifier for each one of the first and second storage entities.

33. The system of claim 32 wherein the first and second storage entities comprise respective contents, and wherein the first device is configured to generate the unique identifiers for the first and second storage entities based on the respective contents of the first and second storage entities.

34. The system of claim 32 wherein the unique identifier is selected from the group consisting of a universally unique identifier (UUID), a globally unique identifier (GUID), a checksum, a hash code, and a digital signature.

35. The system of claim 29 further including at least one input device and at least one output device.

36. The system of claim 35 wherein the output device comprises a display, and wherein the first device is further configured, in cooperation with the display, to implement a graphical user interface.

37. The system of claim 36 wherein the first device is further configured, in cooperation with the display, to display a representation of the first information from within the second information storage entity.

38. The system of claim 37 wherein the input device comprises a mouse, wherein the representation of the first information is displayed within an active region of the display, and wherein the first device is further configured, in cooperation with the mouse and the display, to enable a human operator to select the representation of the first information within the active region of the display, and, in response to the selection of the human operator, to display a human readable representation of the first provenance meta-data.

39. The system of claim 36 wherein the first device is further configured, in cooperation with the display, to display a graphical representation of dependency relationships between the plurality of information storage entities.

40. The system of claim 39 wherein the graphical representation of dependency relationships includes symbols representing the respective information storage entities, representations of selected information within the information storage entities, and representations of interconnections between the storage entity symbols, and wherein the storage entity symbols, the representations of selected information, and the representations of interconnections between the symbols are arranged for visually indicating which information storage entities include representations of the selected information.

41. The system of claim 29:
wherein the first device is coupled to at least one network; and
wherein the first device is further configured:
to transmit, over the network, the second information storage entity to at least one second device coupled to the network,
thereby propagating the updated first provenance meta-data within the second information storage entity with the first information as the second information storage entity is transmitted over the network.

42. The system of claim 29 wherein the first device is further configured:
to obtain a first identifier of the original source information storage entity of the first information, the original source information storage entity including predetermined first content, the first identifier being previously generated based on the predetermined first content of the original source information storage entity; and
to obtain, at least at some times, a second identifier of the intermediary source information storage entity from which the first information was last provided, the intermediary source information storage entity including predetermined second content, the second identifier being previously generated based on the predetermined second content of the intermediary source information storage entity.

43. The system of claim 42 wherein the first device is further configured:
to determine the first portion of the data structure using the first identifier of the original source information storage entity; and
to determine, at least at some times, the second portion of the data structure using the second identifier of the intermediary source information storage entity.

44. A computer implemented method of managing and maintaining traceability of information as the information is provided to a plurality of information storage entities, the method comprising the steps of:
storing, by a first device, first information in a first information storage entity, the first information comprising information for which provenance is desired;
generating first provenance meta-data indicating the provenance of the first information stored in the first information storage entity, the first provenance meta-data having a data structure for defining the provenance of the first information, the data structure including at least a first portion including an indication of an original source information storage entity of the first information, and a second portion including an indication of an intermediary information storage entity from which the first information was last provided;
incorporating the first provenance meta-data into the first information storage entity;
in response to a predetermined user-initiated action:
storing, in a second information storage entity, at least one representation of the first information stored in the first information storage entity; and
automatically updating the first provenance meta-data, the updated first provenance meta-data having the data structure including at least the first portion including the indication of the original source information storage entity of the first information, and the second portion including the indication of the intermediary information storage entity from which the first information was last provided,
wherein the first information storage entity is indicated in the updated first provenance meta-data as the intermediary information storage entity;
in response to the predetermined user-initiated action to store the representation of the first information in the second information storage entity, propagating the updated first provenance meta-data to the second information storage entity for storage in the second information storage entity;
modifying the first information within the first information storage entity;
determining a presence of the at least one representation of the first information within the second information storage entity using the updated first provenance meta-data;
in response to the determination of the presence of the at least one representation of the first information within the second information storage entity using the updated first provenance meta-data, substituting a representation of the modified first information for the representation of the first information within the second information storage entity,
wherein the second information storage entity includes a representation of at least one calculated quantity;
recalculating each calculated quantity within the second information storage entity that depends upon the modified first information;

substituting a representation of the recalculated quantity for the representation of the calculated quantity within the second information storage entity; and in a displaying step, displaying a graphical representation of dependency relationships between the plurality of information storage entities including the first information storage entity and the second information storage entity, wherein the graphical representation of dependency relationships includes symbols representing the respective information storage entities, representations of selected information including the first information within the respective information storage entities, and representations of interconnections between the storage entity symbols, wherein the symbols include a first symbol representing the first information storage entity and a second symbol representing the second information storage entity, wherein the displaying step includes associating at least one representation of the first information with at least one representation of an interconnection between at least the first symbol representing the first information storage entity and the second symbol representing the second information storage entity, thereby providing a visual indication of a provenance of the first information.

45. The method of claim 44 further including the step of visually indicating which storage entities include representations of the selected information by a visual arrangement of the storage entity symbols, the representations of selected information, and the representations of interconnections between the symbols.

46. The method of claim 44 wherein the generating of the updated first provenance meta-data comprises:

obtaining a first identifier of the original source information storage entity of the first information, the original source information storage entity including predetermined first content, the first identifier being previously generated based on the predetermined first content of the original source information storage entity; and obtaining, at least at some times, a second identifier of the intermediary source information storage entity from which the first information was last provided, the intermediary source information storage entity including predetermined second content, the second identifier being previously generated based on the predetermined second content of the intermediary source information storage entity.

47. The method of claim 46 wherein the generating of the updated first provenance meta-data further comprises:

determining the first portion of the data structure using the first identifier of the original source information storage entity; and determining, at least at some times, the second portion of the data structure using the second identifier of the intermediary source information storage entity.

48. A computer implemented method of managing and maintaining traceability of information as the information is provided to a plurality of information storage entities, the method comprising the steps of:

storing, by a first device, first information in a first information storage entity, the first information comprising information for which provenance is desired;

generating first provenance meta-data indicating the provenance of the first information stored in the first information storage entity, the first provenance meta-data having a data structure for defining the provenance of the first information, the data structure including at least a first portion including an indication of an original source information storage entity of the first information, and a second portion including an indication of an intermediary information storage entity from which the first information was last provided;

incorporating the first provenance meta-data into the first information storage entity;

in response to a predetermined user-initiated action:

storing, in a second information storage entity, at least one representation of the first information stored in the first information storage entity; and automatically updating the first provenance meta-data, the updated first provenance meta-data having the data structure including at least the first portion including the indication of the original source information storage entity of the first information, and the second portion including the indication of the intermediary information storage entity from which the first information was last provided, wherein the first information storage entity is indicated in the updated first provenance meta-data as the intermediary information storage entity;

in response to the predetermined user-initiated action to store the representation of the first information in the second information storage entity, propagating the updated first provenance meta-data to the second information storage entity;

modifying the first information within the first information storage entity;

creating a new version of the second information storage entity including the at least one representation of the first information;

determining a presence of the at least one representation of the first information within the second information storage entity using the updated first provenance meta- data; and in response to the determination of the presence of the at least one representation of the first information within the second information storage entity using the updated first provenance meta-data, substituting a representation of the modified first information for the representation of the first information within the new version of the second information storage entity, wherein the second information storage entity includes a representation of at least one calculated quantity;

recalculating each calculated quantity within the second information storage entity that depends upon the modified first information; and substituting a representation of the recalculated quantity for the representation of the calculated quantity within the second information storage entity.

49. The method of claim 48 further including the step of generating a unique identifier for each one of the first information storage entity, the second information storage entity, and the new version of the second information storage entity.

50. The method of claim 48 wherein the generating of the updated first provenance meta-data comprises:

obtaining a first identifier of the original source information storage entity of the first information, the original source information storage entity including predetermined first content, the first identifier being previously generated based on the predetermined first content of the original source information storage entity; and obtaining, at least at some times, a second identifier of the intermediary source information storage entity from which the first information was last provided, the intermediary source information storage entity including predetermined second content, the second identifier being previously generated based on the predetermined second content of the intermediary source information storage entity.

51. The method of claim 50 wherein the generating of the updated first provenance meta-data further comprises:

determining the first portion of the data structure using the first identifier of the original source information storage entity; and determining, at least at some times, the second portion of the data structure using the second identifier of the intermediary source information storage entity.

52. An information management system that maintains traceability of information as the information is provided to a plurality of information storage entities, and as each of the plurality of information storage entities is transmitted from one device to at least one other device over at least one network, the system comprising:

at least one network; and a plurality of devices coupled to the network, the plurality of devices including at least one first device and at least one second device, wherein the first device is configured:

to store first information in a first information storage entity, the first information comprising information for which provenance is desired;

to generate first provenance meta-data indicating the provenance of the first information stored in to the first information storage entity, the first provenance meta-data having a data structure for defining the provenance of the first information, the data structure including at least a first portion including an indication of an original source information storage entity of the first information, and a second portion including an indication of an intermediary information storage entity from which the first information was last provided;

to incorporate the first provenance meta-data into the second information storage entity;

in response to a predetermined user-initiated action:

to store, in a second information storage entity, at least one representation of the first information stored in the first information storage entity; and to automatically update the first provenance meta-data, the updated first provenance meta-data having the data structure including at least the first portion including the indication of the original source information storage entity of the first information, and the second portion including the indication of the intermediary information storage entity from which the first information was last provided, wherein the first information storage entity is indicated in the updated first provenance meta-data as the intermediary information storage entity;

to propagate, in response to the predetermined user-initiated action to store the representation of the first information in the second information storage entity, the updated first provenance meta-data to the second information storage entity for storage in the second information storage entity;

to transmit, over the network, the second information storage entity containing the first information and the updated first provenance meta-data to the second device;

to modify the first information within the first information storage entity;

to determine a presence of the at least one representation of the first information within the second information storage entity using the updated first provenance meta-data;

in response to the determination of the presence of the at least one representation of the first information within the second information storage entity using the updated first provenance meta-data, to propagate a representation of the modified first information to the second information storage entity;

wherein the second device is configured:

to substitute the representation of the modified first information for the representation of the first information within the second information storage entity, wherein the second information storage entity includes a representation of at least one calculated quantity;

to recalculate each calculated quantity that depends upon the modified first information; and to substitute the representation of the recalculated quantity for the representation of the calculated quantity within the second information storage entity, and wherein one of the plurality of devices is configured:

to display, in cooperation with a display, a graphical representation of dependency relationships between the plurality of information storage entities including the first information storage entity and the second information storage entity, wherein the graphical representation of dependency relationships includes symbols representing the respective information storage entities, representations of selected information including the first information within the respective information storage entities, and representations of interconnections between the storage entity symbols, wherein the symbols include a first symbol representing the first information storage entity and a second symbol representing the second information storage entity, wherein the graphical representation of dependency relationships further includes a graphical representation of at least one association of at least one representation of the first information with at least one representation of an interconnection between at least the first symbol representing the first information storage entity and the second symbol representing the second information storage entity, thereby providing a visual indication on the display of a provenance of the first information.

53. The system of claim 52 wherein the first device is further configured to execute the software program to visually indicate, in cooperation with the display, which storage entities include representations of the selected information by a visual arrangement of the storage entity symbols, the representations of selected information, and the representations of interconnections between the symbols.

54. The system of claim 52 wherein the first device is further configured:
   to obtain a first identifier of the original source information storage entity of the first information, the original source information storage entity including predetermined first content, the first identifier being previously generated based on the predetermined first content of the original source information storage entity; and
   to obtain, at least at some times, a second identifier of the intermediary source information storage entity from which the first information was last provided, the intermediary source information storage entity including predetermined second content, the second identifier being previously generated based on the predetermined second content of the intermediary source information storage entity.

55. The system of claim 54 wherein the first device is further configured:
   to determine the first portion of the data structure using the first identifier of the original source information storage entity; and
   to determine, at least at some times, the second portion of the data structure using the second identifier of the intermediary source information storage entity.

* * * * *